United States Patent
Dunlap et al.

[15] 3,635,687
[45] Jan. 18, 1972

[54] DOWNDRAWING METHOD FOR PRODUCING VERY THIN GLASS SHEETS

[72] Inventors: Glenn H. Dunlap, Maumee; Anthony M. Kobylak, Rossford; John E. Miller, Toledo, all of Ohio

[73] Assignee: Owens-Illinois, Inc.

[22] Filed: May 26, 1970

[21] Appl. No.: 40,616

[52] U.S. Cl. .................................................. 65/106, 65/94
[51] Int. Cl. ........................................................ C03b 17/00
[58] Field of Search ................... 65/17, 63, 64, 91, 103, 106, 65/93, 94, 96, 199, 200, 90, 92

[56] References Cited

UNITED STATES PATENTS

| 3,563,720 | 2/1971 | Kunihiko et al. | 65/91 X |
| 814,612 | 3/1906 | Lubbers | 65/63 |

*Primary Examiner*—Arthur D. Kellogg
*Attorney*—E. J. Holler and Eugene F. Dwyer

[57] ABSTRACT

A method for the production of thin glass from preformed glass blanks by heating the glass to attenuation temperature, maintaining the edge portions of the glass at a temperature above attenuation temperature but lower than the center portion of the glass and attenuating the deformable glass to produce a very thin sheet with a larger useable, planar area and closely controlled, dimensional tolerances. The heating furnace is improved by a pair of channel members disposed within the furnace and forming a path of travel from the glass and reducing the temperature of the glass edge portions. This process provides a method of increasing the total useable area of the preformed blank and permitting close control of the dimensional thickness of the attenuated glass sheet. The prior art methods produced glass sheets having areas of thin dimensions where the area and the thickness dimension is a constant ratio of the width to the thickness of the sheet. This process produces sheets having a width to thickness ratio three times that of the prior art sheet.

4 Claims, 3 Drawing Figures

PATENTED JAN 18 1972

INVENTOR.
GLEN H. DUNLAP
BY ANTHONY M. KOBYLAK
JOHN E. MILLER
E. J. Holler
E. F. Dwyer
ATTORNEYS

DOWNDRAWING METHOD FOR PRODUCING VERY THIN GLASS SHEETS

SUMMARY OF THE INVENTION

Glass blanks are heated to raise the temperature to the attenuation temperature of the particular glass composition and are then attenuated; however, the useable area of thin glass sheet produced by the prior art process does not represent more than about one-third of the total area of the original blank. At attenuation temperature, edge portions of the sheet are maintained at a temperature lower than the center portion, and the sheet is attenuated to produce an area of thin glass. The thin area is closely controlled in its dimensional tolerance. The reduced temperature of the edge portions increases viscosity and, thereby restricts the width reduction, and permits a thinner dimension through the thickness. The glass edge temperature is reduced by shielding the glass from the heat of the furnace, and/or the application of additional positive cooling to the edge portions of the sheets.

DESCRIPTION OF THE PREFERRED EMBODIMENTS

Figure 1:
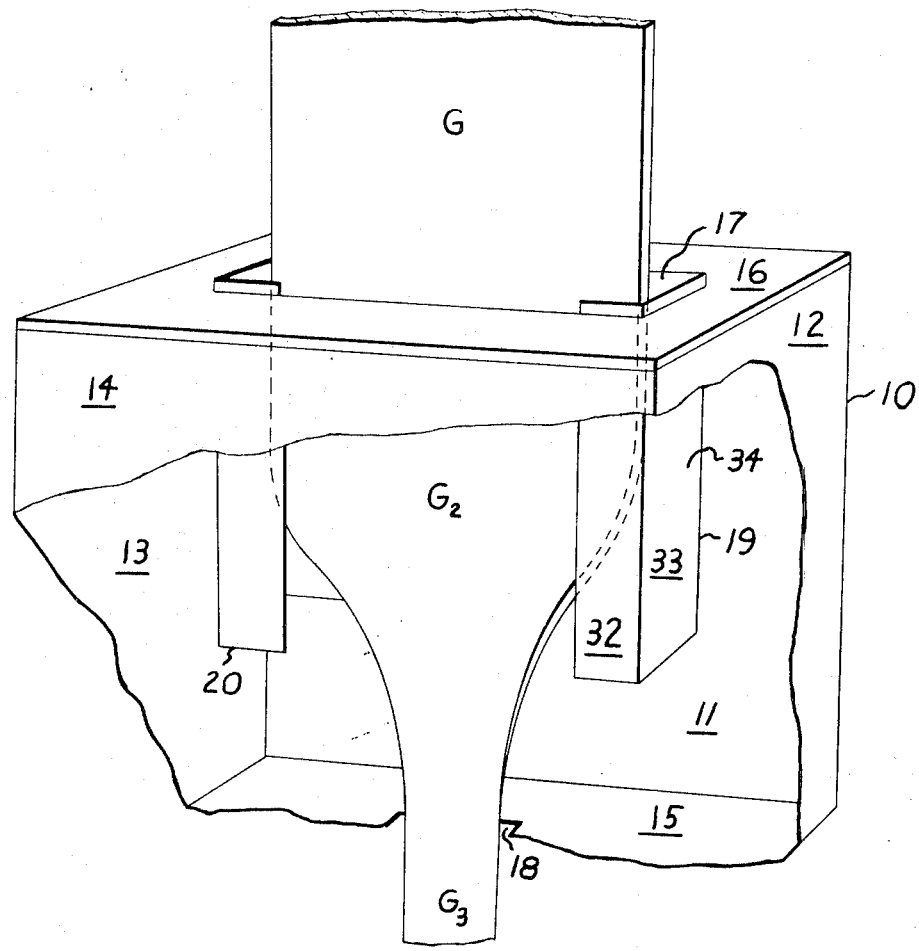
FIG. 1 is a perspective, cutaway view of the downdrawing apparatus.

In conventional, flat-glass redrawing operations, a preformed glass blank is heated to attenuation temperature and attenuated to produce a planar area of the blank, having a reduced thickness. The conventional redrawing process has an inherent disadvantage in that the width of the redrawn sheet obtained for a specified redrawn thickness is a fixed function of the width of the preformed blank and its original thickness. In the conventional, flat-glass downdrawing, redrawing processes, the selection of the size of a preformed sheet or blank is based on three factors: the ultimate sheet thickness desired, the ultimate sheet thickness tolerance, and the ultimate desired sheet width. The preformed w/t ratio is the relationship existing between the width vs. the thickness, of the attenuated sheet, that is, as the ratio increases, the width of the preformed sheet reduces at an increasingly lesser rate than the thickness. This example illustrates the principle of the preform ratio:

A 20-inch width, ¼-inch thick, preformed sheet will have a width/thickness ratio equal to 80, it will redraw in a conventional manner to a sheet having the width of three-fourths of an inch × 0.003 inch thick, which is a width thickness ratio equaling 250 to 1. The width vs. thickness ratio increase is approximately 3 times. For some commercial applications of this thin glass, using the prior art process, the variation of thickness cannot exceed a tolerance of + or −0.0002 inch, therefore to obtain a commercially useable width from the total sheet width having a thickness variation within the above magnitude only about 50 percent of the total thin glass redrawn width can be used.

Other process variables common to redrawing operations such as the feed speed of the original blank, the drawing speed, are in the same ranges as are known in the conventional, redrawing processes.

This invention provides a process and apparatus in producing thin glass sheets having a greater area of useable glass.

Figures 2, 3:
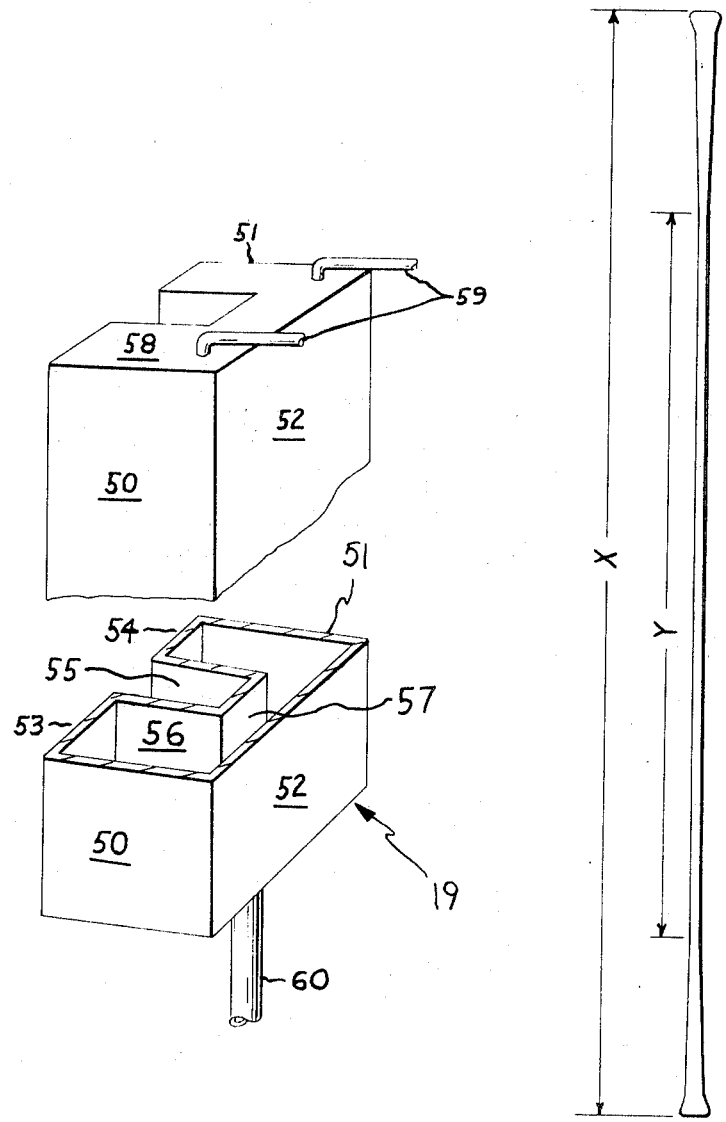
FIG. 2 is a perspective view of an edge-cooling apparatus.
FIG. 3 is a cross-sectional view of a thin glass sheet produced by this process.

A conventional redrawing furnace operation is improved by the addition of edge-cooling apparatus. The edge-cooling apparatus may be of a heat-sink type or a positive cooling type, using air, water or other fluids. A pair of channels, preferably of stainless-steel, are positioned inside the furnace, in a manner that permits the preformed blank to travel through the channels and for a channel to surround a portion of the edge of the flat glass blank as shown in FIG. 2. The channel surfaces are treated on the side directed away from the glass with a reflective ceramic coating, to reflect direct radiation from the furnace panels. The interior of the channel of the glass facing the side is treated with an absorbing coating to eliminate any stray heat radiation scattering onto the glass blank.

The furnace is essentially closed except for the top and bottom panels, which have a narrow gap, in the order of ¼-inch clearance on either side of the flat glass blank. It is necessary in some cases, due to the low thermal shock resistance of soda-lime glass blanks, that a preheating operation be performed to prevent the glass from cracking and breaking. In one embodiment of the disclosed arrangement, the narrowed gap between the glass blank and the furnace cover permits a semicontrolled heat escapement which essentially acts to preheat the glass blank; however, it is usual and possible to have a separate preheating section to achieve this.

APPARATUS OF THE INVENTION

FIG. 1 is a perspective view with a cutaway section showing the general arrangement of the edge coolers in a conventional furnace. The furnace is indicated at 10. A pair of channel members for edge cooling 19 and 20 are disposed vertically within the furnace, forming a path of travel for the downwardly moving glass "G."

The furnace is an elongated box having panels 11, 12, 13 and 14 forming an enclosed boxlike structure. A pair of panels 15 and 16 form end closures for the top and bottom of the furnace. Each end panel has an opening 17 and 18 respectively.

In the embodiment of FIG. 2, the channel is constructed so that a cooling fluid, such as air or water, is introduced into the channel through inlet tubes 29 and 30. The fluid is exhausted through exhaust pipe 31.

FIG. 1 shows the furnace with a pair of channel members 19 and 20. Channel member 19 has three panels; front panel 32, side panel 33, and back panel 34, forming a "U"-shaped configuration, designed to extend over a portion of the glass in the edge area thereof. The glass preform is passed into the furnace and, in an initial portion of the furnace in the upper region, designated as zone 1, the glass receives a preheating treatment.

In zone 2, which is a portion of the furnace lower than zone 1, the glass is heated above attenuation temperature and the principal attenuation of the sheet occurs in zone 2, in zone 3, lower portion of the furnace, the glass may be slightly further attenuated; however, the principal activity of zone 3 is to stabilize the temperature of zone 2 and serve also as a means to control the cooling rate of the attenuated sheet. The channel members 19 and 20 of FIG. 1 are treated with a heat-reflecting coating on the outside and a dark or black coating on the inside to eliminate stray heat radiations within the channel member. The channels are constructed of a heat-resisting material, stainless-steel, used successfully and is the preferred material of construction.

In a preferred embodiment, the top of the cooling furnace and channels are open to produce a natural chimney effect, achieving a maximum flow of air and hence, to control edge cooling.

FIG. 2 illustrates an embodiment of an edge cooler designed to use a fluid for cooling such as water, steam, etc. The elongated channel member 19 is formed of a plurality of panels. A pair of side panels 50 and 51 are connected by an end panel 52. A pair of front panels 53 and 54 enclose a portion of the channel facing the glass. A "U"-shaped indentation in the channel is formed by edge panels 55 and 56 and edge end panel 57. The channel member is closed at the top by top end panel 58. Conduits 59 and 60 are provided for the entry and exit of the cooling fluids. The channel is disposed within the furnace to form a path of travel for the glass and the panel members 55 and 56 overlap edge portions of the glass.

PROCESS OPERATION

The width of the ribbon is divided arbitrarily into edge portions and a central portion. The edge portions are usually considered to be up to a distance of one-third the total width of the ribbon. A preformed blank is inserted into the furnace and heated to attenuation temperature. The furnace is divided into a plurality of zones of heating. Zone 1 is generally a preheat zone. Zone 2 is a heating zone, and zone 3 and subsequent zones are for the purpose of contributing to the temperatures and stability of zone 2 and, also, to provide a means of controlled reduction of the temperature of the glass sheet.

In a preferred embodiment, using heat sink type edge coolers, the furnace temperatures for soda-lime silica glass are generally about 1,200° F. in zone 1 and about 1,600° F. in zone 2. The temperatures within this improved redrawing furnace are higher than comparable zones in a conventional flat-glass redrawing process. After the glass sheet is heated to attenuation temperature in the area of, as shown in FIG. 1, marked "G," the edges of the glass preformed blank are then cooled to a temperature ranging about from at least 100° to 200° F., below the center of the ribbon portion, in the area of FIG. 1, designated "G2." However, all portions of the glass preformed blank are initially at or above the glass attenuation temperature. The ribbon is then attenuated in or through the force of gravity due to its own weight, or in combination with a conventional nip roll, which applies a stretching pressure and is drawn downwardly.

Other variables in the process, such as the rate of speed of heating the glass and the attenuation force and speed, are in the same ranges as used in conventional redrawing processes.

In another embodiment of this invention, the entire glass sheet is brought to attenuation temperature; however, the edge portions are maintained at or near attenuation temperature while the central portions of the sheet are heated to a temperature above that; at least 100° to 200° F., which is above the temperature of the edge portions. Then, the sheet is attenuated to the desired size and permitted to cool. The location of the attenuation is shown in FIG. 1 and designated as the area of glass "G2." The attenuated and cooled sheet is designated "G3." The direction of travel is shown by the arrow in FIG. 1.

Again, the other variables in the process, such as the rate of speed of feeding the glass and the attenuation for this, are in the same ranges as used in the conventional redrawing processes.

It is believed that when the differential cooling of the edges across the width of the flat preformed glass is employed in this process, the relationship of the preformed width and thickness is a new constant function. The edge cooling tends to retard the width reduction, which changes the width thickness ratio, and, therefore, the useable, redrawn width of the thin glass area increases as much as threefold in comparison with the useable redrawn width of the thin glass areas, using the prior art method. This process permits the use of narrower, original preforms to obtain a desired, thin glass width, because of the increase in the thin planar area, which is not attainable using the prior art methods. The following example 1 shows typical results using the prior art method and the method of this invention.

EXAMPLE I

|  | Without cooling, in. | Edge cooling, in. | Percent gain in film width, percent |
|---|---|---|---|
| Flat glass preform size | (¹) | (¹) |  |
| Drawn film thickness | .0030 | .0030 |  |
| Total film width | .75 | 2.56 | 340 |
| Film width having a thickness variation of (+) .0001 | .375 | 1.63 | 430 |

¹ 20 in. wide x ¼" thick.

FIG. 3 illustrates a piece of glass in cross section, which is drawn by the process of this invention. The total dimension of the area of the ribbon, with a thickness tolerance of + or −0.0001, is approximately two-thirds the total width of the ribbon.

In FIG. 3, the total ribbon width is the designated $x$-dimension and the useable section of the ribbon, which is within the + or −0.0001-inch tolerance, is the wide dimension. In the process of this invention, the $x$-dimension is increased approximately 340 percent over the prior art method. The $y$-dimension is increased approximately 430 percent over the prior art method, using the same size and dimension of the original, preformed sheet. It can be seen that the apparatus and process of this invention provides an improved yield, which reduces the cost of the glass as well as permitting the production of closely controlled sheets having a tolerance within + or −0.0001 inch.

What is claimed is:

1. In a method of downdrawing a glass sheet having a width and thickness dimension from a preformed glass blank, to form a thin sheet, the steps comprising:
   a. heating a preformed blank to its attenuation temperature;
   b. cooling the edges of the glass blank which are parallel to the direction of the draw, 100° to 200° F. lower than the center portion; and
   c. attenuating the blank to form thin sheets by drawing out the blank along the path of the draw.

2. In a method of forming a thin, glass sheet from a preformed glass blank, the steps comprising:
   a. heating a preformed blank to attenuation temperature;
   b. lowering the temperature of edge portions of the blank, relative to the center portion by at least about 100° to 200° F., below the center portions thereof;
   c. maintaining the blank above its attenuation temperature and
   d. downdrawing the blank to form sheets having a thin planar area.

3. In a method of forming a thin glass sheet from a preformed blank, the steps comprising:
   a. heating a preformed glass blank to attenuation temperature, then cooling the edges of the blank which are parallel to the direction of the draw; and
   b. downdrawing the sheet along the axis of the draw to form a thin glass sheet.

4. The process of claim 3 wherein the thin planar area is about 75 percent of the total width of the sheet.

* * * * *